Nov. 15, 1927.
W. G. COX
1,649,447
SHOCK ABSORBER
Filed Nov. 29, 1926
3 Sheets-Sheet 1
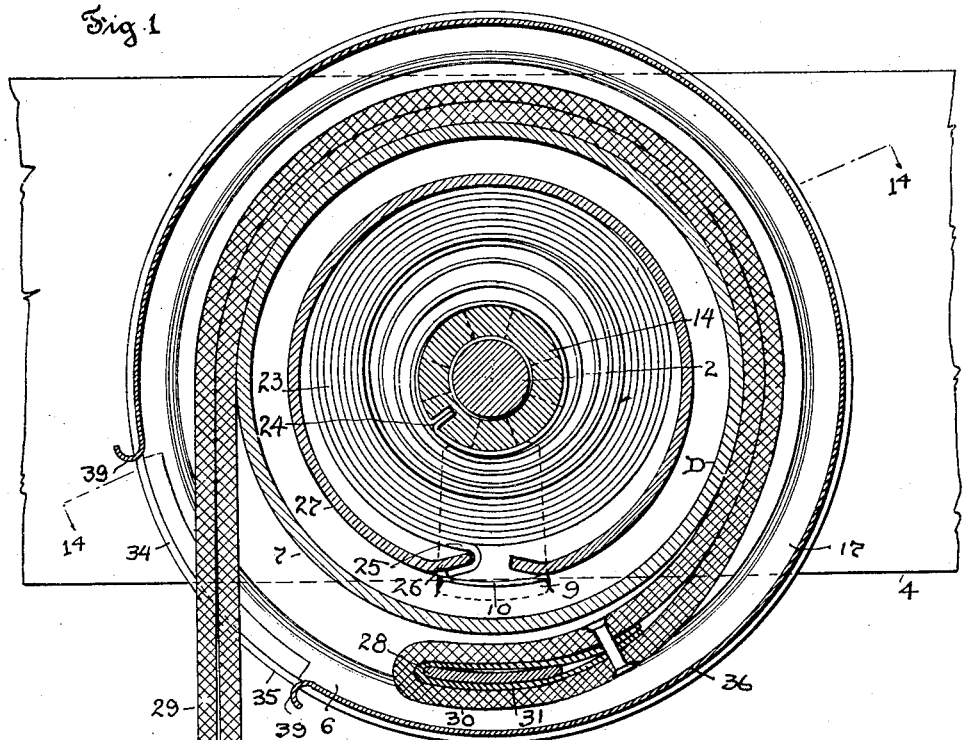
Fig. 1
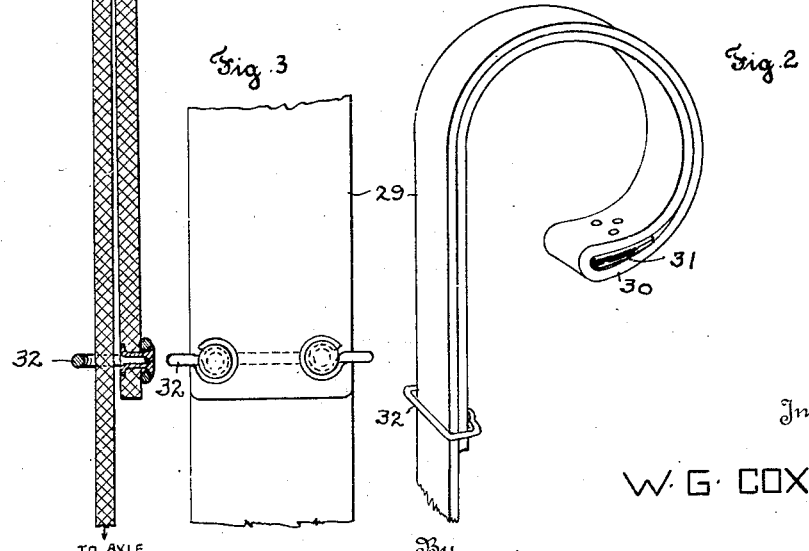
Fig. 3
Fig. 2
TO AXLE
Inventor
W. G. COX
By
Attorney

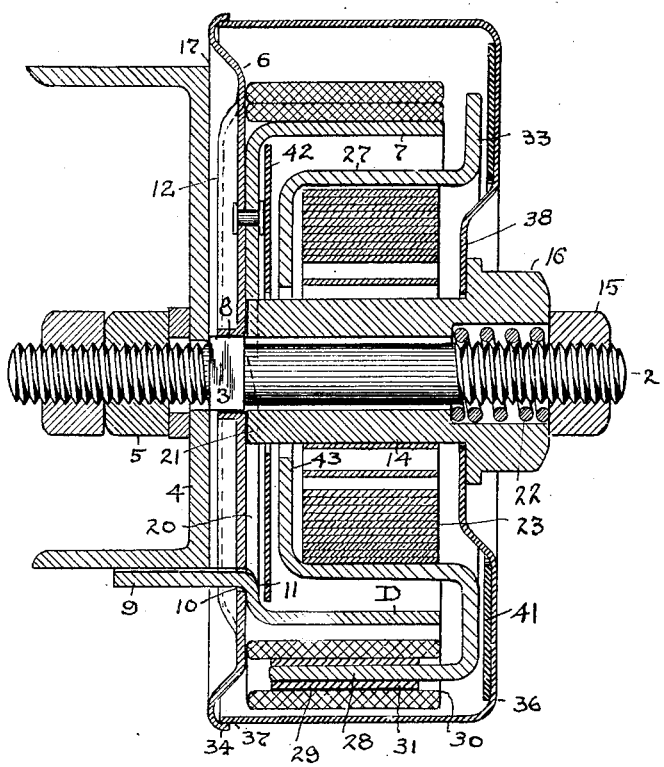

Nov. 15, 1927.

W. G. COX 1,649,447

SHOCK ABSORBER

Filed Nov. 29, 1926

3 Sheets-Sheet 3

Inventor

W. G. COX

By

Attorney

Patented Nov. 15, 1927.

1,649,447

UNITED STATES PATENT OFFICE.

WILLIAM G. COX, OF CLEVELAND, OHIO.

SHOCK ABSORBER.

Application filed November 29, 1926. Serial No. 151,421.

My invention relates to shock absorbers for automobiles, and the present device embodies certain new and useful improvements in the shock absorber for which I filed an application for patent on the 15th day of March, 1926, Serial No. 94,753, all substantially as herein shown and described and more particularly pointed out in the claims. In general the objects of these improvements are to facilitate the manufacture of such a device, to promote the assembly and disassembly of the parts and adjustment thereof, to foster convenient attachment of the device to a car, to reduce the cost, to maintain straight alignment of the belt and prevent wear and tear thereof, and to effect noiseless operation.

Figure 14:
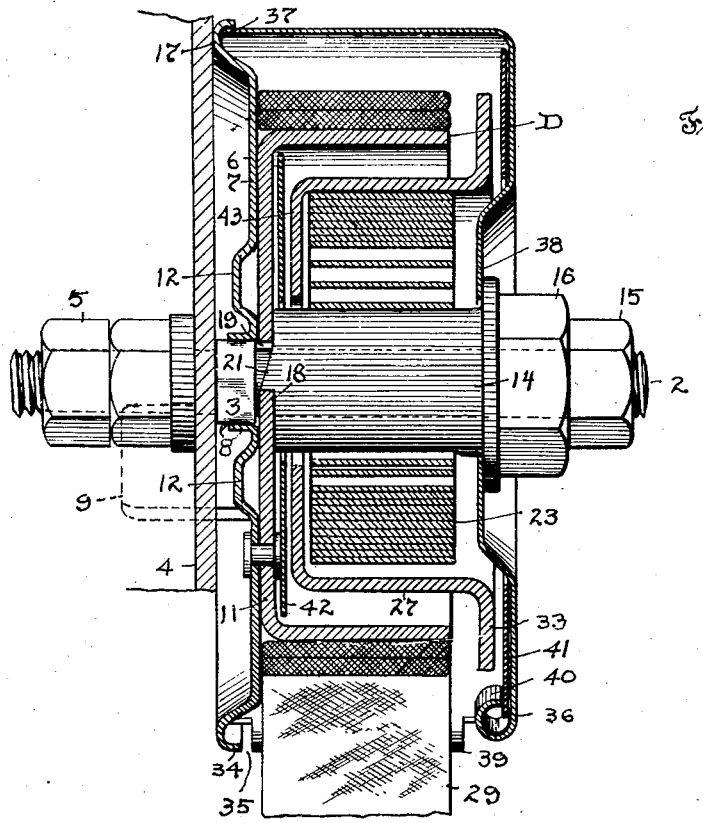
Figure 15:
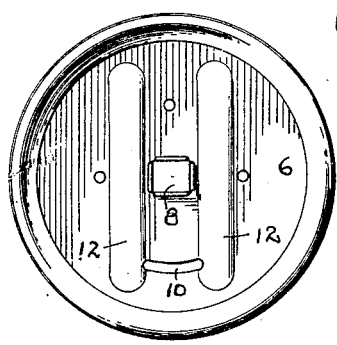
Figure 16:
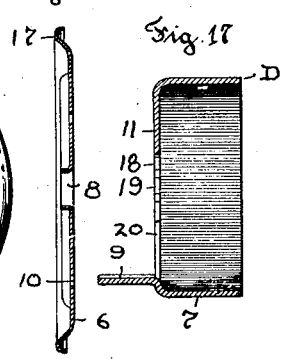
Figure 17:
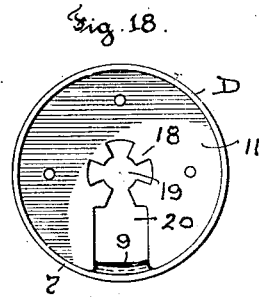
Figure 18:
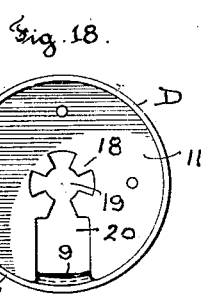

In the accompanying drawings, Fig. 1 is a sectional view of the device affixed to the side of a chassis frame member. Fig. 2 is a perspective view of the double belt, and Fig. 3 is an elevation of a part of said belt showing the wire loop for linking the two plies slidably together. Fig. 4 is a sectional view vertically of the device in the plane of its fastening and supporting bolt. Figs. 5 to 13, inclusive, are side and sectional views of the several parts separated, Fig. 5 showing the supporting bolt secured to a chassis frame member, Fig. 6 showing the stationary brake drum and plate, Fig. 7 illustrating the sound-deadening washer used within the drum member, Fig. 8 showing the retrieving spring and its cage, Fig. 9 representing the sound-deadening washer used inside the casing, Fig. 10 showing the cover or casing, Fig. 11 delineating the spring-winding arbor, and Figs. 12 and 13 picturing the locking spring and nut, respectively. Fig. 14 is a sectional view of the device on line 14—14 of Fig. 1. Fig. 15 is a rear view of the dished supporting plate and Fig. 16 a sectional view thereof apart from the brake drum. Fig. 17 is a sectional view and Fig. 18 a front view of the brake drum separated from the dished plate.

My improved device comprises an independent bolt 2 which is screw-threaded at its opposite ends and formed with a flat sided intermediate enlargement or square collar 3 intermediate the threaded portions. This bolt is clamped rigidly to the channeled side member 4 of a chassis frame, or to a bracket secured to said frame or other fixed part of the automobile frame or other fixed part of the automobile above a wheel axle therein, by means of nuts 5, as shown in Fig. 5. All the other parts of the device are adapted to be removably secured to bolt 2, and such parts may be assembled and separated very readily in orderly array or sequence as indicated in Figs. 5 to 13. Thus a flanged brake drum D made in two sections 6 and 7 is first sleeved over bolt 2. Section 6 is a dished plate pressed from sheet metal and riveted to section 7 which is a dished cylindrical body also drawn or stamped from sheet metal. Plate 6 has a square opening 8 at its center adapted to fit the square enlargement 3 on bolt 2, and the sides of the opening may be flanged outwardly to promote locking and prevent the plate from turning on the bolt. Conversely when plate 6 is fixed against rotation the bolt itself will be held against rotation. Rotatable movement of the plate and cylinder is prevented in a simple and effective way when the plate is sleeved over the bolt into engagement with the vertical wall of chassis member 4. Thus an arm 9 at the rear of the cylinder projects through a slot or opening 10 in plate 6, thereby locking the parts together and permitting the arm to engage the bottom of chassis member 4. As shown arm 9 is an integral part of the rear wall 11 of cylinder 7, but it may be a separate piece riveted or fastened in some other rigid manner to one of the sections. Preferably arm 9 is stamped from wall 11 and bent outwardly at right angles thereto, and it is also pressed into a curved shape transversely to stiffen it and to correspond with the arc shape of opening 10 in plate 6. Consequently when plate 6 and cylinder 7 are assembled the arm projects beyond the rear face of plate 6 where it may contact directly with the bottom edge of frame member 4 or a fixed part thereof, thereby preventing the drum from rotating on or with bolt 2 while the arcuate shape of arm 9 provides sharp angular gripping and seating edges for the arm against member 4.

The means for clamping plate 6 and cylinder 7 against frame member 4 consists of a tubular spring-winding arbor 14 sleeved loosely over bolt 2 together with a lock nut 15 having screw engagement with the outer screw-threaded extremity of said bolt. Thus when lock nut 15 is screwed tightly against the outer face of the hexagonal enlargement 16 of arbor 14 the beaded or rounded flange portion 17 of dished plate 6 is pressed tightly against the outer face of frame member 4 while the central dished area of the plate is spaced apart therefrom so that it may bend or flex slightly under severe screw pressure and a spring clamping effect may be produced. However, the dished wall of plate 6 is formed with parallel ribs 12 adjacent the edges of openings 8 and 10 to re-enforce the plate and prevent buckling thereof, and arbor 14 does not engage plate 6 directly but is made to bear against and interlock with a series of radial teeth 18 in wall 11 of cylinder 7. The said teeth 18 are formed by stamping a cross-shaped bolt opening 19 in the center of wall 11 contiguous to the inner end of the slot or opening 20 which is produced in stamping arm 9 from said wall. Opening 19 is in the shape of a Maltese cross; as a result four flat teeth 18 are provided having straight edges radially in respect to the axis of bolt 2 and arbor 14, and the inner end of arbor 14 is formed with four ratchet teeth 21 adapted to enter the radial recesses between teeth 18 and to engage the edges thereof with self-locking and self-releasing effect. That is, arbor 14 may be locked against rotation in one direction but is otherwise free to disengage itself from teeth 18 providing lock nut 15 at the outer end of bolt 2 is loosened or removed to permit arbor 14 to have a limited longitudinal movement on the bolt during rotative movements of the arbor in a spring-winding direction. A compression spring 22 is mounted within a recess in the outer end of arbor 14 to hold the ratchet teeth 21 in yielding engagement with teeth 18 when nut 15 is partly retired to permit arbor 14 to shift longitudinally on bolt 2.

A spiral spring 23 is mounted upon arbor 14 which is channeled or grooved lengthwise thereof to receive the hook-shaped end 24 of the inner coil of the spring. The outer coil of the spring is also formed with a hook-shaped extremity 25 adapted to engage an inwardly bent lip 26 on the circular wall of a flanged cup or cage 27 for the spring. An arm 28 extends horizontally from the flanged part of the cup or cage 27, and this arm overlaps the periphery of cylinder D and is in effect a mere extension of the outer coil of spring 23 to permit belt 29 to be connected thereto. Thus belt or band 29 runs over the drum or cylinder, one end being connected to the axle of the car while its opposite or free end is connected to arm 28 which is rigidly connected to the last coil of spiral spring 23. Cage 27 is entirely free to rotate apart from the drum or cylinder and does not engage or bear against it at any time, nor does this cage engage with or have rotatable bearing on arbor 14. It acts merely as a retainer and belt connection for the spring.

Belt or band 29 may be made of any suitable flexible material, such as the known woven brake-lining materials which have been treated to prolong wear and to promote a smooth and noiseless braking action. One or more plies of this treated material may be used, preferably a plurality of separate plies formed by folding or doubling the stock upon itself. The doubled end forms a loop 30 which provides a simple means in itself for connecting the belt to arm 28, and a folded strip 31 of thin sheet metal is inserted within the loop and the ends thereof riveted to each other and to the overlapping plies to strengthen and protect the loop and to permit the belt to be freely slipped upon arm 28 prior to introducing the spiral retrieving spring 23 into drum or cylinder D. The belt passes only part way around the cylindrical surface of drum D, say one-half to three-quarters turn around the drum, and thence extends on a straight line to the axle, and both plies may be attached to the axle if desired. However, I prefer to attach only one ply to the axle and make the other or inner ply shorter and to link the free end of the shorter ply in slidable connection with the other ply by means of a loop member 32, which in the present instance, is made of wire riveted at its opposite ends to the short ply near its extremity. Loop member 32 provides a connection for the two plies which permits a creeping movement to take place between them while the belt is passing around the drum in either direction.

When the several parts of the device are assembled the annular flange 33 on housing 27 prevents belt 29 from shifting laterally in one direction, and the dished central part of plate 6 prevents it from shifting laterally in the opposite direction. Plate 6 is also dished or projected inwardly a substantial distance so that its face lies in a different vertical plane than the edge of the reverted border portion or curled flange 34 of said plate. The dished area of the plate therefore guides belt 29 in a straight line and keeps it always apart from the edge of said flange 34, thereby preventing the belt edge from fraying as the belt travels back and forth from the drum or cylinder through an opening 35 in the dome or cover 36, see Fig. 14. A forwardly-projecting flange 34 on plate 6 is useful as it permits the circular edge 37 on cover 36 to be easily seated and securely confined in a rotatable position therein with flange 34 overlapping edge 37 of the cover. In this way the cover may be clamped tightly against the plate by applying pressure centrally to its front wall 38, and the circular edge 37 is enclosed and locked in place without other fastening means. Wall 38 of cover 36 is partly recessed and has a central opening adapted to receive the reduced cylindrical part of arbor 14, thereby permitting the enlargement 16 on the arbor to press against said wall with clamping effect, and as cover 36 is made of sheet metal wall 38 will flex or spring inwardly when engaged by enlargement 16 during longitudinal movement of arbor 14 under the tightening action of nut 15. The transverse edge portions 39—39 of opening 35 in cover 36 are curled outwardly to provide smooth round surfaces which will not subject the belt to wear if cover 36 is accidentally rotated or not set properly. However, the mode of securing the cover rotatably to plate 6 by a central tightening pressure as described herein enables the cover to be readily turned in either direction so that opening 35 may be properly located in respect to belt 29. The front edge of the belt is prevented from fraying in passing through opening 35 by an inwardly curled flange 40 in the circular wall of cover 36 at the front end of opening 35, see Fig. 14.

Curled flange 40 also serves another purpose, that of holding a flat ring 41 of fiber, felt or other sound-deadening material within cover 36 between its dished front wall 38 and flange 33 on the spring cup or cage 27, thus preventing the metal parts from coming into noisy rubbing contact with each other. A similar sound-deadening ring 42 is interposed between the inner wall 11 of cylinder 7 and wall 43 of cup 27, so that the cup will oscillate silently if spring 23 should for any reason shift toward wall 11.

When the device is installed upon a vehicle, the retracting spring 23 is under tension at all times and adapted to take up the slack in the belt or band whenever the body of the vehicle is depressed or the axle is raised. Under such conditions the belt or band slips freely around the drum. Upon a sudden rebound of the body or sudden drop of the axle, the belt or band and its retracting spring produce more or less of a braking action in their travel around the drum, thereby preventing sudden upthrow of the vehicle body, or in other words, checking and dampening the rebound of the vehicle body and springs. The braking action varies as the contact surface between the belt or band and the drum varies. Thus as the intensity of the shocks increase or decrease a corresponding increase or decrease of braking action takes place. I do not claim that such proportional braking of the rebound in a motor vehicle is a new or original idea in view of the prior patent to T. Veitch, No. 910,974, dated January 26, 1909, but confine my claims to the improvements shown and described herein and any mechanical and obvious equivalents thereof.

What I claim, is:

1. A shock absorber for spring vehicles, comprising a drum containing a spring and a cage for the spring, and a double belt detachably connected with said cage and passing around said drum.

2. A shock absorber, comprising a drum and a retriever spring, together with a belt folded upon itself and riveted where folded to provide a closed connecting loop for the spring, said loop having a re-enforcement lining therein.

3. A shock absorber, comprising a drum, a belt having a short ply folded inwardly and engaging the friction face of said drum and slidably connected at its extremity to the main body of said belt beyond the drum, and a retriever spring connected to said belt.

4. A shock absorber, comprising a drum, a belt doubled upon itself and riveted together to form a closed loop and separate long and short plies, means securing the free end of the short ply in slidable connection with the long ply, the short ply passing around and engaging the face of said drum, and a retriever spring connected to the closed loop of said belt.

5. A shock absorber, comprising a drum, a belt doubled upon itself to provide a loop therein and short and long plies, said plies being riveted together at the loop and having a link member connecting the free end of the short ply slidably to the long ply, and a retriever spring connected to the loop of said belt.

6. A shock absorber, comprising a drum, a belt doubled upon itself and providing separate long and short plies, the short ply having a free end extending apart from the drum, a metal lining within the double end of said belt, and a retriever spring having a connection extending through said metal lining.

7. A shock absorber, comprising a cylinder, a backing plate for said cylinder having a dished area and a reverted border edge providing an annular depression in a vertical plane rearwardly of the dished part of said plate, a belt upon said drum withheld apart from said reverted border edge by said dished area, a cover having a circular edge seated within said depression and formed with an opening through which said belt is adapted to extend, and means adapted to clamp said cover against said plate.

8. A shock absorber, comprising a cylinder, a belt around said cylinder, a retriever spring to which said belt is connected, a cover enclosing said parts having an opening for said belt, one edge of said opening being curled inwardly toward the front wall of said cover, and a sound-deadening member secured by said curled edge between said cover and spring.

9. A shock absorber, comprising a cylinder and a separate backing plate therefor having registering bolt openings centrally therein, and a supporting bolt for said parts extending through said openings, said plate having an aperture and said cylinder having an arm extending through said aperture to permit the cylinder to be affixed in a non-rotatable position upon the bolt and a support for the bolt.

10. A shock absorber, comprising a cylinder having an end wall, an arm pressed outwardly from said wall, a supporting plate for said cylinder having an aperture for said arm, a supporting bolt extending centrally through said cylinder and plate, a belt for said cylinder, and a retriever spring connected with said belt and bolt.

11. A shock absorber, comprising a circular supporting plate, a cylinder having an arm extending through said plate adapted to lock said cylinder and plate together, said arm extending beyond the rear face of said plate to permit said parts to be fixed in a non-rotatable position on a supporting member, an attachment bolt for said plate and cylinder, a brake band upon said cylinder, a retriever spring and a cage therefor connected with said band, a spring-winding arbor upon said bolt, and means for clamping said arbor, and drum rigidly together.

12. A shock absorber, comprising a cylinder having a flat end wall from which the stock has been stamped out to form a cross-shaped bolt opening at its center, a supporting attachment bolt for said cylinder extending through said opening, a spring-winding arbor upon said bolt having teeth adapted to interlock with the edges of said cross-shaped opening, a retriever spring connected with said arbor, a brake belt upon said cylinder connected to said spring, and means adapted to clamp said arbor and cylinder together.

13. A shock absorber, comprising a separate cylinder and backing plate having registering openings centrally thereof adapted to receive a bolt; one opening being of angular outline and the other of irregular outline forming border teeth, a bolt having an angular portion adapted to fit said angular opening, a spring-winding arbor having teeth adapted to interlock with said border teeth, a retriever spring connected to said arbor, a belt on said cylinder connected to said spring, and a nut on said bolt adapted to lock said arbor.

14. A shock absorber, comprising a sheet metal plate having a central dished area formed with parallel ribs and a central bolt opening and a slot, a cylindrical drum having an end wall formed with a toothed opening adapted to register with said central opening and provided with an arm adapted to project through said slot, a common supporting bolt for said plate and drum, a spring-winding arbor on said bolt having teeth adapted to interlock with the teeth formed in said wall, a retriever spring connected with said arbor, a belt on said drum connected with said spring, and means adapted to lock said arbor on said bolt.

15. A shock absorber, comprising a cylindrical drum having a flat end wall from which the stock has been stamped out to provide a central opening corresponding in shape to the outline of a Maltese cross, an attachment bolt for the shock absorber extending through said opening, a spring-winding arbor on said bolt having teeth adapted to interlock with the edges of said cross-shaped opening, a retriever spring connected to said arbor, a belt on said drum connected with said spring, and a nut on said bolt adapted to lock said arbor and drum together.

In testimony whereof I affix my signature.

WILLIAM G. COX.